April 5, 1955     O. HARTMAN     2,705,557
COTTON BALE WITH WATERPROOF PROTECTIVE COVERING
Filed Aug. 30, 1952

INVENTOR.
OREN HARTMAN
BY Hazard & Miller
ATTORNEYS

United States Patent Office 2,705,557
Patented Apr. 5, 1955

2,705,557

COTTON BALE WITH WATERPROOF PROTECTIVE COVERING

Oren Hartman, Bakersfield, Calif.

Application August 30, 1952, Serial No. 307,289

1 Claim. (Cl. 206—83.5)

This invention relates to protectors of cotton bales.

In ginning and baling cotton, the customary practice heretofore has been to compress the ginned cotton into a bale and to apply to opposite sides of the cotton that forms the bale sections of Manchester cloth. The ends of these sections of Manchester cloth are drawn over the ends of the bale and secured in position. The two opposite sides of the Manchester cloth cover the two sides to which they are applied and extend only partially over the two intervening sides. Bale ties in the form of metal bands are applied around the cotton and over the Manchester cloth to hold the cotton in baled form. When the bale is completed, the customary practice is to temporarily store the bale at a suitable location in the gin yard, the bales usually being positioned on end and being allowed to rest directly on the soil of the gin yard. The Manchester cloth employed is of a relatively porous nature and neither possesses the characteristic nor is it intended to be waterproof or water-repellant. Consequently, the cotton of the bale very frequently absorbs moisture from the soil on which it rests with the result that spoilage of the lower portion of the bale frequently occurs. During adverse weather conditions rain may fall on top of the bale and wet the top of the bale causing spoilage. The exposed portions of the sides that are not completely covered by the Manchester cloth may also be damaged, not only from rain, but due to dust and sand being blown thereagainst in the event of wind.

To avoid spoilage of the bottom of the bale occasioned by its absorption of moisture from the soil of the gin yard it has been proposed to support the bales on spaced stringers or mud sills. However, this has not proven satisfactory due to the difficulty involved in rolling the bale onto the stringers.

It is a primary object of the present invention to provide a protector which can be easily and quickly applied to a bale of cotton which will enable the bale to be temporarily stored on the soil of the gin yard without danger of spoilage occurring, either due to the absorption of moisture from the soil or from adverse weather conditions.

Another object of the invention is to provide a protector for cotton bales and the like which can be easily and quickly applied, and which can be easily and economically produced and which may be removed from one bale and applied to another.

With the foregoing and other objects in view, which will be made manifest in the following detailed description and specifically pointed out in the appended claims, reference is had to the accompanying drawing for an illustrative embodiment of the invention, wherein:

Figure 1:
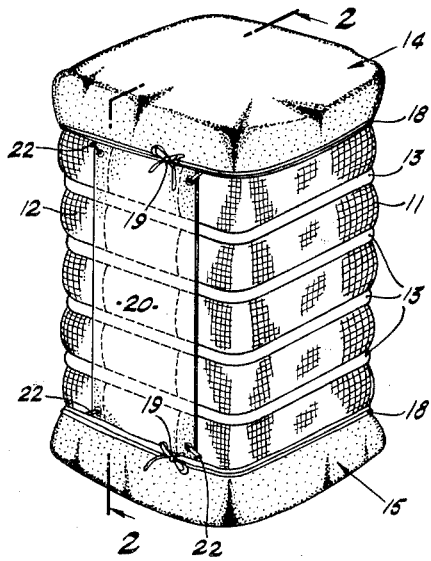
Figure 1 is a perspective view of a cotton bale illustrating the protector embodying the present invention as having been applied thereto.
Figure 3:
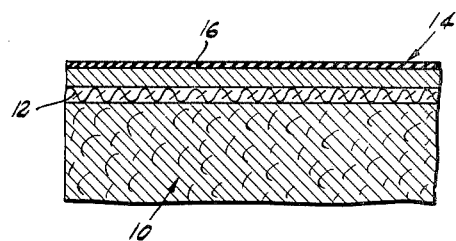
Fig. 3 is a partial view in vertical section on an enlarged scale.
Figure 2:
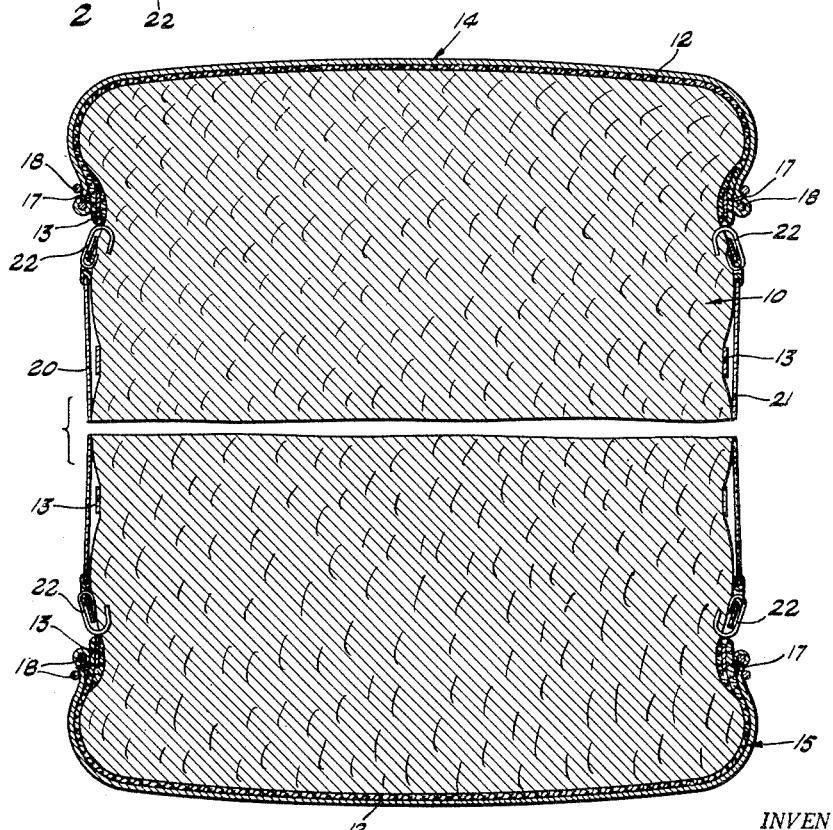
Fig. 2 is a vertical sectional through the bale, taken substantially upon the line 2—2 upon Fig. 1.

Referring to the accompanying drawing wherein similar reference characters designate similar parts throughout, 10 indicates the cotton of a cotton bale to opposite sides of which the conventional sections of Manchester cloth 11 and 12 are applied. These sections have their ends drawn over the ends of the bale in the conventional manner and are retained in position by means of metallic band bale ties 13 which surround the bale. When these ties are applied to the conventional bale the cotton of the bale is in a compressed condition so that the bale ties depress the exterior surface of the bale and form annular indentations around the bale. As above explained, while the Manchester cloth largely covers the ends of the bale and two opposite sides, the Manchester cloth usually does not completely cover the other two sides of the bale so that a portion of the cotton is exposed on these last-mentioned sides. The Manchester cloth conventionally employed is of such a porous nature that it does not resist the entry of moisture.

The protector embodying the present invention comprises two flexible caps, generally indicated at 14 and 15. The caps are preferably ovate in plan and are of such a size and shape as to cover the entire end of the bale and to extend along the sides of the bale at least as far as the first bale tie from the end of the bale. They are preferably formed of fabric, such as canvas and have a coating 16 applied to the exterior thereof. This coating is designed to be waterproof and may be in the form of a rubber coating or of a synthetic resin plastic. The edges of each of the caps are returned and stitched as indicated at 17 so that around the edge of each cap there is a hem designed to receive a draw cord or rope 18, the ends of this draw cord or rope extending out through openings in the hem adjacent each other and may be tied together as indicated at 19. Preferably, a trucker's knot is employed to draw the ends of the draw cord or rope together so as to tighten the hem of each cap very tightly in the indentation in the exterior of the bale that is formed by the bale tie.

Side panels 20 and 21 are provided, which are also formed of the same material and have metallic hooks 22 secured thereto at the corner thereof, such as by passing through grommets. These hooks may be forced into the cotton of the bale and/or Manchester cloth near the edges or hems of the end caps. The side panels are of such a width and length as to completely cover the exposed portion of the cotton of the bale that is left exposed on the two opposite sides by the Manchester cloth.

When the cotton bale is equipped with the end caps and the side panels comprising the protector, the bale may be temporarily stored on end in the conventional manner on the soil of the gin yard. The waterproof coating 16 prevents the cotton of the bale from absorbing moisture from the soil and the coating of the upper end cap likewise protects the bale in the event or rain. In the event of wind carrying dust and sand the side panels effectively protect the exposed portions of the cotton that are left exposed by the Manchester cloth. I find that these side panels even though mounted on the bale in a relatively taut condition tend to vibrate or flutter in the wind so that any sand or dust that may tend to collect between the side panels and the sides of the bale are effectively kept in an agitated condition by this fluttering.

It will be appreciated that the end caps and side panels can be easily and quickly applied to the bale and removed therefrom and can be used consecutively on successive bales. In arid regions where there is little likelihood of rain, only the bottom end cap 15 need be applied and in such regions where there may also be a likelihood of wind, the bottom end cap and only the panels need be applied.

It is relatively important that the waterproof coating be on the exterior of the fabric. I find that if the waterproof coating is distributed throughout the fabric or is on the interior of the fabric that there is a tendency to cause the bale to "sweat." By having the waterproof coating on the exterior of the fabric and the fabric either in direct contact with the cotton of the bale or with the Manchester cloth covering for the bale danger of "sweating" is eliminated.

From the above-described construction it will be appreciated that an improved protector for cotton bales has been provided which will enable the cotton of the bale to be adequately protected against ingress of moisture. By thus protecting the bale against moisture either by rainfall or by absorption from the soil substantial amounts of cotton may be saved against spoilage.

Various changes may be made in the details of construction without departing from the spirit and scope of the invention as defined by the appended claim.

I claim:

In a cotton bale having a partial wrapping thereabout, having a number of depressions formed therein by bale ties encircling the bale at spaced intervals, caps of flexible material applied over the ends thereof and extending into the sides of the bale, said material being waterproofed on the exterior side thereof, said end caps having hems at their marginal edges, draw cords in the hems tightened to draw the marginal edges of the end caps into the most adjacent depressions found in the sides of the bale by said bale ties thus maintaining the end caps in applied position on the bale, and side panels formed of flexible material applied to the sides of the bale to cover the cotton exposed thereon between edges of the bale wrapping, said material being waterproofed on the exterior side thereof, said panels being alternately spaced from and in contacting relationship with the said bale due to the depressions formed by said bale ties, said side panels having hooks at their corners driven into the cotton of the bale to support the side panels in cotton covering position.

References Cited in the file of this patent

UNITED STATES PATENTS

| | | |
|---|---|---|
| 983,492 | Harriss | Feb. 7, 1911 |
| 1,090,565 | Port | Mar. 17, 1914 |
| 1,607,406 | Margolius | Nov. 16, 1926 |
| 1,609,030 | Margolius | Nov. 30, 1926 |
| 1,647,169 | Anton | Nov. 1, 1927 |
| 1,687,004 | Briggs | Oct. 9, 1928 |
| 1,846,585 | Clark | Feb. 23, 1932 |
| 2,614,630 | Moszelt | Oct. 21, 1952 |